United States Patent Office 3,454,764
Patented July 8, 1969

3,454,764
PROCESS OF MAKING DIAZO COPIES BY SUBLIMATION OF REACTANT MATERIALS ONTO A COPY SHEET
Charles P. Collier and John L. Shellabarger, Santa Barbara, Calif., assignors to Printing Arts Research Laboratories, Inc., Santa Barbara, Calif., a corporation of Delaware
No Drawing. Filed Sept. 10, 1965, Ser. No. 486,538
Int. Cl. G01n 21/34
U.S. Cl. 250—65   28 Claims

ABSTRACT OF THE DISCLOSURE

The disclosure describes processes for making copies from a graphic subject. The processes utilize a difference in the infrared absorbing properties of the graphic subject to cause a sublimation of a portion of a coating which is applied directly to the surface of the graphic subject. The portion of the coating which is sublimed reacts with a second sheet placed in contact with the coated graphic subject. The sheets are exposed to infrared radiation. The sheets are then separated and the second sheet is developed by exposure to alkaline vapor. This second sheet may serve either as a copy or as a master for the production of copies. A thermoplastic coating may be utilized upon the surface of the second sheet. If a thermoplastic coating is used, the coating reacts with the sublimating material to form a coating which selectively transmits an alkaline vapor. Both diazonium compounds and metallic salts are utilized.

---

This invention relates to the graphic arts and has particular reference to a process which is capable of the production of diazo copies from opaque originals, and the articles produced thereby. The process of the present invention is particularly suited for the production of projection transparencies and diazo masters, but it is to be understood that it is not limited thereto nor is it limited to the use of opaque originals.

Projection transparencies are copies of graphic subjects on transparent or translucent film. These copies are usually projected (and enlarged) onto screens or walls by means of transmitted light for viewing by groups of people for educational or amusement purposes. Normally, image areas of the subject are projected as black (essentially no light projection) in a background of maximum light projection. For example, a projection transparency made from typewritten text on bond paper would consist of non-projecting (black) type characters upon a clear background. The blocking of light in the image areas is accomplished by the use of non-light transmitting or light scattering substances in those areas.

Various modifications of this basic system are in use, e.g., the image areas transmit light while the background transmit less or no light, or colored light; or the reverse; or the projection may be multi-colored. Essentially, however, any projection transparency is a duplication of an original graphic subject. Such duplication consists of light absorbing and light transmitting areas as defined by light reflecting and light absorbing areas of the original subject; and the duplication is capable of being projected by transmitted light.

Diazo masters are originals or copies of graphic subjects which consist of light transmitting paper or film on which the image areas are essentially opaque to light in the wavelength range to which a diazo film or paper is sensitive.

While there are known methods for the production of projection transparencies and other types of duplications by the diazo process, these methods depend on the fact that light is capable of decomposing diazonium compounds and require that the original which is being copied be capable of transmitting light. Thus, known diazo processes are limited to the use of translucent or transparent originals and are incapable of producing copies of opaque originals nor are they suitable for producing copies of originals printed on both sides.

In the conventional diazo copying process, the formation of colored azo dyes from the reaction of diazonium compounds with couplers is employed. The graphic subject such as a typewritten page or line drawing on a translucent or transparent sheet is placed over the diazo sensitized paper or film and exposed to light capable of decomposing diazonium compounds, such as ultraviolet light. The sensitized paper or film is provided with a coating which essentially, contains a diazonium compound, a coupler and an acid. The acid prevents premature reaction between the diazonium compound and coupler. The assembly is then exposed to light which passes through the non-image areas of the original but is effectively blocked by the image areas thereof. The diazonium compound in those areas of the diazo sensitized coating which are impinged by light is decomposed. After exposure to light, the sensitized coating is treated with ammonia. This neutralizes the acid and allows the remaining diazonium compound in the image areas to combine with the coupler and form a colored dye, thereby producing a copy of the original graphic subject.

The foregoing description is believed to make clear the necessity that the graphic subject be on a translucent or transparent sheet in conventional diazo copying processes since in the absence of such a translucent or transparent sheet, it would not be possible to decompose the diazonium compound in the non-image areas by exposure to light. A primary object of the present invention is therefore to provide a novel process for the production of copies by the diazo process from opaque originals or moderately translucent originals which do not transmit sufficient light for expeditious diazo copying by conventional methods.

A further object of the present invention is to provide a novel thermographic process for the production of copies by the diazo process from any existing subject so long as it is in the form of an infrared absorbing graphic image.

Another object of the present invention is to provide novel articles in the form of projection transparencies or other duplications.

Another object of the present invention is to prepare diazo masters from which further diazo copies can be made in the conventional manner.

Other objects and advantages of this invention it is believed will be readily apparent from the following detailed description of specific embodiments thereof.

Briefly a preferred embodiment of the process of the present invention comprises a thermographic method which is capable of reproducing opaque originals on diazo sensitized transparent film or translucent paper or other such materials prepared with latent coloring agents specifically developable by the methods of this invention. This process makes use of a procedure which is perhaps best characterized by the term "sublimography" and which is disclosed in copending application Ser. No. 403,323, filed Oct. 12, 1964, the disclosure of which is incorporated herein by reference. Sublimography is a form of the vapor transfer thermography system. Another form of vapor transfer system is disclosed in British Patents 943,401; 943,402 and 943,403 as well as in South African Patent 60/431, all in the name of Abram Games. In the process of the present invention, use is made of the sublimation of a compound characterized by having the property of subliming at a temperature substantially lower than its melting temperature. For example, it is preferred to use salicylic acid in the present process which compound melts at 158 C. and sublimes at 78° C. As disclosed in copending application Ser. No. 403,323, this sublimography process reduces the spread of the image or images by reason in part at least of the fact that there is no melting and/or liquid flow of the transferring material.

In carrying out the process of this embodiment of the present invention, the sensitized side of a diazo sensitized sheet is first coated with a thermoplastic material resistant to the transmission of ammonia. The original graphic subject is coated with a sublimable material which when commingled with the thermoplastic coating on the diazo sensitized sheet makes the thermoplastic coating permeable to ammonia. The thus treated diazo sheet and original graphic subject are placed against each other with the coated surfaces in contact with each other. This assembly is then exposed to infrared radiation for a suffijcient length of time to sublime a substantial quantity of the sublimable material which forms the coating on the original graphic subject from the graphic subject without substantial melting of the sublimable material. It is to be understood that, while the sublimable material originally applied to the graphic subject covers substantially all areas thereof including both the infrared absorbent image areas such as typewritten or printed letters and the white or other spaces between and surrounding the image areas, the sublimable material is selectively sublimed and is transferred in substantially greater quantities from the graphic subject to the thermoplastic coating in the image areas, due to absorption by the image areas of the infrared radiation with resultant generation of the heat for sublimation, the non-image areas reflecting the radiation and remaining relatively cool so as to substantially reduce or preclude sublimation of the sublimable material therefrom. At the same time, the thermoplastic coating softens in those areas opposite to or in contact with the image areas as a result of the absorption of infrared radiation by the image areas and the result is a commingling, in those portions of the thermoplastic coating in juxtaposition with the image areas, of the ammonia-impervious thermoplastic coating and the sublimable material. The diazo sensitized transparent film or translucent paper and the original graphic subject are then separated and the diazo sensitized sheet is treated with ammonia and is then exposed to light to decompose the uncoupled diazo compound.

In carrying out the first step of application of the thermoplastic coating to the diazo sensitized coating, any conventional method including dipping, spraying, etc. may be used. The concentration of the thermoplastic material in the solvent and the amount of solution applied to the diazo surface should be such as to yield a dried coating of the thermoplastic material having a relatively thin depth, preferably in the range of about 0.00005 to 0.0003 inch. This coating should, of course, be continuous and relatively scratch resistant. It has been found that a 10% solution of terpene resin, with a melting point of 70° C., in petroleum distillates is quite suitable and may be applied by means of a laboratory coating rod.

In carrying out the second step of application of the sublimable material to the original graphic subject, the sublimable material, in finely powdered form, can be dusted on the original sheet containing the graphic images or it can be sprayed thereon with the sublimable material dissolved in a suitable solvent. A particularly effective means for applying or coating the sublimable material onto the graphic subject, one which is especially adapted for office use, comprises a charging sheet of the type disclosed in copending application Ser. No. 299,401, filed Aug. 1, 1963, the disclosure of which is incorporated herein by reference, such sheets consisting of thin but tear-resistant paper, coated on one side with infrared absorbing material and on the other with the sublimable material. It has been found that common printers ink, the pigment of which is carbon black, will produce a highly suitable infrared absorbing material and that a solution of 10% salicylic acid in isopropanol, brush or machine applied to the opposite side, will dry rapidly and deposit sufficient salicylic acid for the process. In the use of such a charging sheet, it is placed against the image bearing surface of the graphic subject with the coating of sublimable material on the charging sheet in contact with the image bearing surface. While such contact is maintained, the infrared absorbing surface of the charging sheet is exposed to infrared radiation, sufficient heat being produced thereby to sublime significant quantities of the sublimable material and to effect transfer thereof onto the image bearing surface of the graphic subject, where the sublimable material deposits upon cooling to provide a substantially continuous and uniform stratum thereof on the subject. The used charging sheet is then discarded.

The preferred sublimable material for use in the process of the present invention is salicylic acid, but other materials can be substituted in whole or in part for salicylic acid, including, but not being limited to, benzoic acid, ortho-chlorobenzoic acid, chloranil, isatin, anthranilic acid, ortho-hydroxylbenzyl alcohol, ortho-aminophenol, etc.

The thermoplastic material used to coat the sheet upon which the duplication is to be produced according to the process of the present invention should be sensitive to the sublimable material when heated to the sublimation temperature. The term "sensitive" as used in this context is intended to apply to materials which, during the process of transfer of the sublimable material from the subject to the thermoplastic material, become softened or otherwise acted upon by the sublimed vapors so that the deposited sublimable material becomes commingled with or forms an integral part of the thermoplastic coating. Among the thermoplastic materials which are suitable for use in the present invention are terpene resins having a melting point in the range 60° C. to 120° C., Chlorowax 70 (Diamond Alkali Co.), coumarone-indene resins having a melting point in the range of about 60° C. to 120° C., etc. Such materials must be ammonia-impervious. In addition, the thermopalstic material and sublimable material must be capable of cooperating to render the thermoplastic material permeable to ammonia when they are commingled.

In the production of copies according to the present invention, the diazo sheet is exposed to ammonia after transfer of the sublimable material and separation of the original graphic subject. The ammonia cannot penetrate the ammonia-impervious thermoplastic film except in those areas which are adjacent the image areas of the original graphic subject where the salicylic acid or equivalent compound has commingled with the thermoplastic coating. This penetration of ammonia neutralizes the acid in the diazo coating so that the diazonium compound may combine with the coupler to form a colored dye. A somewhat longer developing time may be required in the process of the present invention as compared to conventional diazo film processing because the ammonia must neutralize the sublimable acid as well as the acid used to stabilize the diazo coating. However, excessively prolonged exposure to ammonia must be avoided to prevent bleeding of the ammonia from the image areas into the diazo coating under the protective ammonia-impervious thermoplastic coating. This is easily accomplished by maintaining a relatively uniform atmosphere of ammonia and using a predetermined exposure time. Such exposure times may, given the principle of the present invention, be determined by routine experimentation.

The final step of exposing the film to light to decompose the uncoupled diazonium compound is in the nature of a fixing step and functions to prevent any further dye formation. The resulting product is a duplication of the original graphic subject on a sheet which may be transparent or translucent and which may then be used as a projection transparency or diazo master. As previously stated, the original graphic subject may be opaque.

Conventional diazo sensitized transparent films or translucent sheets may be used in the practice of the present invention and among the suitable commercially available materials are Poly-Max film and Tecnifax magenta film (manufactured by Tecnifax Corp.), Ozalid 402 IZE (manufactured by General Aniline Film Corp.).

A modification of this embodiment of the present invention comprises incorporating the thermoplastic ammonia-resistant material into the original diazo coating in place of the resinous binder normally used thereby eliminating the need to perform the step of applying a thermoplastic ammonia-resistant coating to the diazo sheet. This diazo sensitized sheet may then be processed as described above and yields a product having deeply dyed images on a very lightly colored background. The lightly colored background results from the coupling of the dye at the surface of the ammonia-resistant coating.

A further modification of this embodiment of the present invention comprises the production of negative duplications rather than the positive duplications described above. According to this modification, projection transparencies designed to project a clear image in a colored background may be produced. In this embodiment of the present invention, the acidity of acidic sublimable materials such as salicylic acid, benzoic acid and ortho-chlorobenzoic acid is used to inhibit the combining of the diazo compound with a coupler during the ammonia development thereby inhibiting dye formation. This is accomplished by introducing an inhibiting amount of the acidic sublimable material into the diazo coating in those areas in juxtaposition with the image areas of the graphic subject by treating the diazo sheet by the thermographic transfer of salicylic acid or other acidic sublimable material in the manner described above. This results in an increase in the concentration of salicylic acid in the areas on the diazo sensitive sheet which were opposite to or in contact with the image areas of the graphic subject. Thus, when the sheet is exposed to ammonia for a time sufficient to produce a deep color in the non-image areas, coupling is effectively inhibited in the image areas. The sheet is then exposed to light to decompose the remaining uncoupled diazonium compound and prevent any further dye formation. The resulting negative may then be used as a projection transparency if the duplication is produced on a light-transmitting film and will project clear image areas in a colored background.

A still further modification of this embodiment of the present invention comprises using a highly water sensitive diazo compound in the negative duplication process described above such that the entire diazo sheet is colored during ammonia development. It has been found that after development, the image areas, which are impregnated with the acidic sublimable material, such as salicylic acid, are quite sensitive to rubbing and may be readily removed by wiping with a dampened cloth or tissue. The resulting product is a negative which may be used as a projection transparency and which will project clear image areas in a colored background.

Another embodiment of the present invention comprises using salicylic acid as a sublimable coupler. According to this embodiment, film or translucent paper coatings containing a diazonium salt, such as paranitrobenzene-diazonium fluoroborate, which is capable of coupling with a sublimable material such as salicylic acid, and an inhibiting acid such as citric acid, are treated by the thermographic transfer of sublimable material, e.g., salicylic acid. When developed with ammonia or other suitable alkali, the salicylic acid couples with the diazonium compound and forms an intensely yellow color. Since the thermographic transfer of salicylic acid is image-wise, the resultant copy is a yellow positive capable of being used as a diazo master or a positive through which a positive-working offset printing plate may be produced. Other sublimable couplers, useful for this purpose, are ortho hydroxybenzyl alcohol and ortho aminophenol. These sublimable compounds can couple with p-amino-N-ethyl-N-hydroxyethylbenzene-diazonium chlorozincate, p-diazodimethylaniline, zinc chloride and p-morpholinobenzene-diazonium fluoroborate and the resulting colored images are yellow to sepia, and can be used as diazo masters.

A further modification of the sublimable coupler process described above substitutes certain metallic salts for the diazonium compound. When, for example, ferric sulfate, ferrous lactate or ceric sulfate is impregnated in translucent paper or in gelatin coated clear plastic film, and treated by the thermographic transfer of salicylic acid as previously described, a dark brown image is formed by developing with ammonia or other suitable alkali. This image is a positive duplication of the original graphic subject and can be used as a diazo master or, in the case of clear gelatin film, as a projection transparency. The dark brown color of the image areas probably results from the formation of a metal-salicylate complex which develops during the treatment with ammonia or other weak base.

Another embodiment utilizes the solvation ability of salicylic acid neutralized with ammonia. Neither the coupling or combining capabilities of diazonium salts and couplers or metal ions and salicylic acid are required for this embodiment.

Many dyes in powder or crystalline form are relatively devoid of color as compared to their color intensity in solution or when dissolved and applied to dyeable materials, such as paper, cloth and the like. For example, Naphthol Blue Black (C.I. Acid Black 1) is grayish black in powder or crystalline form. When this dry powder is rubbed into the surface of translucent paper, the paper colors only to very light gray. However, if a drop of water is applied to the dye-carrying surface, the dye is dissolved and forms a deep blue-black color. Upon drying, the dye retains its deep blue-black color rather than reverting to the original light gray color of the powder.

If the undissolved dye-impregnated paper is treated by the thermographic image-wise transfer of salicylic acid, the blue-black color is developed in the salicylic acid image areas by the subsequent ammonia treatment, while the background remains light gray. It is assumed that a solvation of the dye occurs with the neutralization of salicylic acid by ammonia.

If dyes are used that are, in their dissolved or highly colored form, absorptive of light to which diazo coatings are normally sensitive, then the resultant salicylic acid treated ammonia developed copy can be used as a diazo master from which subsequent diazo copies can be made. Examples of such dyes are Alizarine Orange 2GN (C.I. Mordant Orange 1), Brilliant Yellow (C.I. Direct Yellow 4) and Grasol Fast Yellow 3GL (C.I. Solvent Yellow 48). By the addition of Naphthol Blue Black (C.I. Acid Black 1), a more deeply colored image (visually perceptive) is obtained which is still usable as a diazo master.

The dyes used for this embodiment need not be water soluble, but are limited to those which are solvated by the product of the neutralization of salicylic acid or other suitable sublimable compounds by ammonia or other weak bases.

For example, Grasol Fast Yellow 3GL is not soluble in water but is usable in the process. This dye, as well as Grasol Fast Pink 5BL and Grasol Fast Orange 2RN (C.I. Solvent Orange 33), can be ground to a fine powder and suspended in an aqueous polyvinyl alcohol solution and coated upon a clear cellulose acetate or polyester base sheet. The coating is lightly colored and appears gray by transmitted light because dye particles are dispersed throughout the film, rather than dissolved therein. When this film coating is treated by the image-wise thermographic transfer of salicylic acid and subsequently developed with ammonia, the image areas become intensely colored. A projection transparency, so made, contains deeply colored image areas on a light gray background.

EXAMPLE I

This example describes the preparation of a positive duplication suitable for use as a projection transparency, the original graphic subject comprising a sheet of bond paper containing a typewritten text, this sheet, of course, being opaque. A transparent diazo sensitized film available commercially as Poly-Max Film (Tecnifax Corp.) was provided with a thermoplastic ammonia-resistant coating on the sensitized side thereof by applying a 10% solution in petroleum distillates of terpene resin having a melting point of 70° C. by means of a laboratory coating rod and then dried to yield a coating having a thickness of about 0.0002 inch. For the purpose of providing a coating of salicylic acid distributed over the entire surface of the typewritten side of the subject, a charging sheet of short-fiber paper having a thickness of about 0.001 inch was provided with a surface coating of black-pigmented printer's ink provided by a conventional printing process. On its opposite side, the sheet of short-fiber paper was provided with a uniform and continuous coating of a solution comprising 10% salicylic acid by weight in isopropyl alcohol, applied by brushing the solution on the surface, it being understood that conventional spray or other machine equipment could be used for this purpose in production. Upon evaporation of the alcohol, salicylic acid adhered to the paper in a film-like layer of very finely divided particles.

The charging sheet was then placed, black side up, against the subject to be copied, so that the salicylic acid side of the charging sheet was in intimate contact with the typed side of the subject. The superimposed pair of sheets were then passed through a model 47 Thermofax copying machine (manufactured by Minnesota Mining & Mfg. Co.). In this machine, the black, infrared absorbing surface of the charging sheet was directly exposed to the infrared radiation, the heat produced by only very short-time irradiation being sufficient to sublime sufficient quantities of the salicylic acid from the charging sheet uniformly onto the subject surface, the operation being complete upon emergence of the superimposed sheets from the machine. The used charging sheet was discarded and the treated original subject, then ready for further processing as described below, contained a substantially continuous and uniform crystallized stratum of salicylic acid which was practically invisible and was adapted to the transmission of infrared radiation.

The thus treated subject sheet was then placed against the diazo sensitized film having the coating of thermoplastic ammonia-resistant material thereon cut to the size of the subject sheet with the thermoplastic coating in contact wih the salicylic acid coating on the subject. This assembly of the subject sheet and the diazo sensitized film was passed through the Thermofax machine with the film on top and exposed to the quartz lamp. The heat generated by absorption of the infrared radiation in the image areas of the subject was sufficient to cause sublimation, without melting, of substantial portions of the salicylic acid from the typed image areas of the subject, substantially no salicylic acid being sublimed from the white, reflective areas of the subject sheet, while at the same time causing softening of the thermoplastic coating in the areas opposite to or in contact with the image areas of the subject sheet thereby causing a commingling in the image areas of the ammonia-impervious coating and the salicylic acid. Upon emergence of the sheet and film from the machine, the film was separated from the sheet and was exposed to ammonia at a temperature of 130° F. to 145° F. for a time of 15 to 20 seconds. The ammonia-resistant thermoplastic coating effectively prevented penetration of the ammonia into the diazo sensitized film except in those areas where the salicylic acid had commingled with the coating, i.e., in the image areas. This penetration of ammonia neutralized the acid in the diazo coating thereby permitting the diazonium compound to react with the coupler to form a colored dye.

After completion of ammonia treatment, the developed film now bearing colored images on a clear background was exposed to high intensity carbon arc light for a time of 15 seconds. This exposure decomposed the uncoupled diazonium compound thereby preventing any further dye formation. The resulting duplication of the opaque original graphic subject was suitable for use as a projection transparency.

EXAMPLE II

The process of this example was substantially the same as that of Example I, except that in place of the diazo sensitized film coated with an ammonia-resistant thermoplastic material, a diazo sensitized coating having the thermoplastic ammonia-resistant material incorporated therein was used. According to this example, a diazo sensitive resin solution was prepared by dissolving 20 grams of coumarone-indene resin, 4 grams of 2,3 naphthalenediol (which functions as a coupler) and 2 grams of p-diazo-N,N-diethyl-m-toluidine zinc chloride in 60 ml. of acetone and 40 ml. of toluene. This solution was coated on a transparent polyester film having a thickness of 3 mil to result in a dried coating approximately 0.0002 inch thick. This film was then treated in the manner described in Example I commencing with the step of coating the graphic subject with salicylic acid by means of the charging sheets described therein. The resulting product was a transparency having dark blue image areas on a light blue-gray background. The lightly color background is the result of a small amount of coupling and dye formation which occurs at the surface of the ammonia-resistant film in the non-image areas.

EXAMPLE III

The process of this example was substantially the same as that of Example I, but produced a negative duplication, i.e., a clear image on a colored background, rather than a positive image, i.e., a colored image on a clear background. According to this example, a diazo sensitive film was prepared by dissolving 10 grams of ethylcellulose resin of 7 centipoise viscosity, 4 grams of 2,3-naphthalene-diol (which functioned as a coupler), 2 grams of p-diazo-N,N-diethyl-m-toluidine zinc chloride and 2 grams of salicylic acid in 50 ml. of methylethyl ketone, 25 ml. of methanol and 25 ml. of ethylcellosolve. This solution was coated on a transparent polyester film having a thickness of 3 mil to result in a dried coating having a thickness of approximately 0.0002 inch. After the coating had dried, the film was treated according to the procedure described in Example I commencing with the step of providing a coating of salicylic acid on the original graphic subject. In this example, the film was treated with ammonia for 5 to 8 seconds at a temperature of 130° F. to 145° F. This ammonia treatment was such as to permit a deep blue color to form in the non-image areas without the formation of color in the image areas. Color formation was effectively inhibited in the image areas by the excess of salicylic acid therein created by the thermographic transfer of salicylic acid.

In the practice of this embodiment of the invention, it is, of course, necessary to terminate the ammonia developing treatment prior to the time when substantial color begins to form in the image areas since prolonged treatment with ammonia will substantially decrease the difference in color intensity between the image and non-image areas. The length of time for which a given system should be exposed to ammonia to produce the desired result will, given the principle of this embodiment of the present invention, require nothing more than routine experimentation. As in the previous examples, the final step of exposing the ammonia treated film to light serves to decompose the remaining uncoupled diazonium compound and prevent any further dye formation. The resultant projection transparency projected clear image areas in a deep blue background.

In the practice of this embodiment of the present invention, it is desirable to use a diazo compound and coupler which are relatively insoluble in water. In the production of the diazo sensitized film, Lytron (a copolymer of styrene and maleic anhydride manufactured by Monsanto Chemical Co.) or PVM/MA (a copolymer of methyl vinyl ether and maleic anhydride manufactured by Antara Chemical Co.) may be substituted for ethylcellulose, citric acid may be substituted for salicylic acid and the diazo compound, p-diazo-N,N-diethyl-m-phenetidine, zinc chloride and the coupler, m-hydroxy phenylurea may be substituted for the diazo compound and coupler disclosed in this example. If a relatively water soluble diazo compound is used in the process of this example, the entire film will be colored during the ammonia development. Such water soluble compounds do not render the present invention inoperative, but merely rather require that an additional processing step be employed to produce a negative duplication as described in Example IV.

EXAMPLE IV

A diazo sensitive resin solution was prepared by dissolving 10 grams of ethylcellulose, 5 grams of 2,3-naphthalenediol (which functions as a coupler), 3 grams of p-morpholinobenzene-diazonium fluoroborate and 2 grams of salicylic acid in 40 ml. methylethyl ketone, 40 ml. methanol and 20 ml. ethylcellosolve. This solution was coated on a transparent polyester film having a thickness of 3 mil to produce a dried coating having a thickness of approximately 0.0002 inch. The film was then treated in the same manner as that described in Example III except the exposure to light to decompose remaining uncoupled diazonium compound was not necessary. The ammonia treatment developed deep violet color throughout the entire diazo sensitive coating. Upon wiping this colored coating with a very slightly dampened cleansing tissue, the salicylic acid image areas were cleared from the base polyester film and from the contiguous colored areas. The resulting projection transparency projected clear image areas in a deep violet background.

Another relatively water soluble diazo compound which could be used in this embodiment of the present invention is diazo p-diazophenylmorpholine borofluoride.

Negative projection transparencies produced according to the present invention may be used as negatives for offset printing plates when the colored background is such that it effectively blocks light to which such plates are sensitive.

EXAMPLE V

This example describes the use of salicylic acid as a coupler for a specific diazonium compound. A film-forming solution was prepared by dissolving 17 grams polyvinyl alcohol of low viscosity grade (Gelvatol 40-10, Shawinigan Resins Corporation, Springfield, Mass.) in 77.3 grams water. One and nine-tenths grams of diazonium salt, para-nitrobenzene diazonium fluoroborate, and 3.8 grams citric acid were dissolved therein and the solution coated on 3 mil clear polyester film. The citric acid was present to inhibit discoloration of the diazonium compound. The dried coating was approximately 0.0001 to 0.04 inch thick, and was light yellow in color.

A typewritten subject on opaque bond paper was charged with salicylic acid by use of the charging sheet and thermographic copying machine as previously described. The charged subject was then placed against the prepared film coating and passed through the thermographic copying machine. Substantial portions of salicylic acid were sublimed from the black image areas of the subject and passed to and commingled with juxtaposed areas of the film coating. The film was then separated from the subject and exposed to ammonia at a temperature of 130° F. to 145° F. for approximately 10 to 20 seconds. Those areas of the film coating, where salicylic acid had commingled, developed a deep yellow color, while no change was perceptible in the light yellow background.

After completion of the ammonia treatment, the film coating was exposed for 10 seconds to a carbon-arc lamp to decompose the remaining uncoupled diazonium compound, thus preventing any further dye formation. The resulting deep yellow positiive duplication of the original subject was suitable for use as a diazo master or positive from which a positive-working offset printing plate could be prepared.

EXAMPLE VI

Dry ferric sulfate powder was rubbed into the surface of a translucent paper identified as "No. 880-750," and manufactured by General Aniline and Film Corporation Binghampton, N.Y. After the excess powder had been removed, approximately 0.1 gram ferric sulfate was retained by 935 square inches of paper. A catalog page, printed on both sides was charged on one side with salicylic acid in the manner previously described. The ferric sulfate treated paper was then placed against this salicylic acid charged subject and passed through a thermographic copying machine, the infrared light passed through the translucent paper before impinging on the salicylic acid charged subject. Substantial portions of salicylic acid were sublimed from the black image areas of the subject, and transferred to the surface of the translucent paper where the acid commingled with the ferric sulfate thereon.

The translucent paper was then separated from the subject and exposed to ammonia at a temperature of 130° F. to 145° F. for 10 to 15 seconds. The image areas where the ferric sulfate and salicylic acid had commingled turned deep brown during this ammonia development, while the background remained relatively free of color.

The developed copy was then used as a diazo master for preparing conventional diazo copies.

EXAMPLE VII

A 0.000125 inch gelatin coating on 3 mil cellulose acetate was impregnated with ferrous lactate by soaking the film in a saturated aqueous solution of ferrous lactate for 5 minutes. Soaking the film for more than 5 minutes did not substantially increase the concentration of ferrous lactate in the gelatin coating. The gelatin coating was allowed to dry and was then processed in the manner described with regard to the ferric sulfate impregnated sheet of Example VI. The resulting copy was a transparent film containing deep brown image areas. It was suitable for use as a projection positive or as a diazo master.

EXAMPLE VIII

In a manner similar to that described in Example VI, Alizarine Orange 2GN (C.I. Mordant Orange 1) was applied to Ozalid No. 880 translucent paper (General Aniline and Film Corporation). Approximately 0.05 gram of the dye were retained by 935 square inches of paper, and produced a faintly orange colored sheet. When, in the manner of Example VI, this sheet was treated by the image-wise thermographic transfer of salicylic acid and subsequently developed by ammonia, deep orange image areas were formed. The copy was used as a diazo master and as a positive from which a lithographic printing plate was prepared.

EXAMPLE IX

Five grams of finely powdered Grasol Fast Pink 5BL were dispersed in an aqueous solution comprising 7.5 grams of polyvinyl alcohol (Gelvatol 40–10, Shawinigan Resins Corporation) in 100 ml. of water. The polyvinyl alcohol was used as a film former. This dispersion was coated on clear 3 mil polyester film to produce a dried coating thickness of approximately 0.0001 to 0.0003 inch. The coating had a gray-violet appearance but when projected on a screen its color was nearly white.

The coated film was treated by the image-wise thermographic transfer of salicylic acid and developed with ammonia as described in Example VI. Deep red image areas were formed and the copy was usable as a projection transparency. It projected deep red image areas upon a light gray background.

Having fully described our invention, it is to be understood that we do not wish to be limited to the details set forth, but that our invention is of the full scope of the appended claims.

We claim:

1. A process for making diazo copies from a graphic subject containing infrared absorbent image areas and background areas having relatively non-infrared absorbent properties, comprising the steps of applying a substantially uniform stratum of a sublimable material onto said graphic subject, placing said stratum-containing subject in contact with the coated surface of a sheet having a coating thereon comprising a diazonium compound, a coupler capable of combining with said diazonium compound to form a colored dye, an acidic composition capable of and present in sufficient amount to prevent said dye formation and an alkaline vapor-resistant thermoplastic material, exposing said sheet and said graphic subject to infrared radiation for a time sufficient to heat and cause sublimation of quantities of said sublimable material from said images areas onto said coating without substantial melting of said sublimable material and to cause softening of said thermoplastic material in the areas in juxtaposition with said images thereby permitting commingling of said sublimable material and said thermoplastic material, said sublimable material rendering said thermoplastic material permeable to alkaline vapor when the two are commingled, separating said sheet from said subject, and developing colored images on said sheet corresponding to those on said subject by exposing said sheet to an alkaline vapor for a time sufficient to permit those areas of said sheet wherein said thermoplastic material and said sublimable material are commingled to be penetrated by said alkaline vapor whereby said diazonium compound and said coupler combine to form a colored dye.

2. The process of claim 1 wherein said developed sheet is exposed to light for a time sufficient to decompose the remaining uncoupled diazonium compound and thereby prevent any further dye formation.

3. The process of claim 1 wherein said thermoplastic material comprising a coating which covers said diazonium compound, coupler and acidic material.

4. The process of claim 1 wherein said thermoplastic material is mixed with said liazonium compound, said coupler and said acidic material.

5. The process of claim 1 wherein said graphic subject is substantially opaque.

6. The process of claim 1 wherein said sheet is light-transmitting.

7. The process of claim 1 wherein said graphic subject has a surface containing infrared absorbent image areas and background areas having relatively non-infrared absorbent properties and wherein said substantially uniform stratum of sublimable material is applied to said surface.

8. The process of claim 1 wherein said thermoplastic material is ammonia-resistant and said alkaline vapor is ammonia.

9. The process of claim 1 wherein said sublimable material is salicylic acid.

10. A process for making diazo copies from a graphic subject containing infrared absorbent image areas and background areas having relatively non-infrared absorbent properties comprising the steps of applying a substantially uniform stratum of an acidic sublimable material onto said graphic subject, placing a coated sheet in contact with stratum-containing surface, said coating comprising a diazonium compound, a coupler capable of combining with said diazonium compound to produce a colored dye and an acidic material capable of and present in sufficient amount to prevent said diazonium compound to produce a colored dye and an acidic material capable of and present in sufficient amount to prevent said diazonium compound and said coupler from forming a dye prematurely, said diazonium compound being capable of being effectively inhibited from combining with said coupler by said acidic sublimable materials, exposing said sheet and said stratum-containing surface to infrared radiation for a time sufficient to heat and cause sublimation of quantities of said sublimable material from said image areas onto said sheet in the areas in juxtaposition with said images without substantial melting of said material, separating said sheet from said subject, exposing said sheet to alkaline vapor for sufficient time to permit said diazonium compound and said coupler in said background areas to combine to form a colored dye, but for an insufficient time to permit substantial dye formation in said image areas thereby forming a developed sheet, and exposing said developed sheet to light for a time sufficient to decompose the uncoupled diazonium compound remaining in said image areas whereby further dye formation is prevented.

11. The process of claim 10 wherein said graphic subject is substantially opaque.

12. The process of claim 10 wherein said sheet is light-transmitting.

13. The process of claim 10 wherein said graphic subject has a surface containing infrared absorbent image areas and background areas having relatively non-infrared absorbant properties and wherein said substantially uniform stratum of sublimable material is applied to said surface.

14. The process of claim 10 wherein said alkaline vapor is ammonia.

15. The process of claim 10 wherein said sublimable material is salicyclic acid.

16. A process for the production of diazo copies from a graphic subject containing infrared absorbent image areas and background areas having relatively non-infrared absorbent properties, comprising the steps of applying a substantially uniform stratum of an acidic sublimable material onto said graphic subject, placing the coated surface of a coated sheet in contact with said stratum-containing subject, the coating on said coated surface comprising a diazonium compound, a coupler capable of combining with said diazonium compound to form a colored dye, an acidic material capable of and present in sufficient amount to prevent said diabonium compound and said coupler from combining to form a colored dye, exposing said sheet and said stratum-containing surface to infrared radiation for a time sufficient to heat and cause sublimation of quantities of said sublimable material from said image areas onto said sheet in the areas in juxtaposition with said images without substantial melting of said sublimable material, separating said sheet from said subject, exposing said sheet to alkaline vapor from said subject, exposing said sheet to alkaline vapor to cause said diazonium compound to combine with said coupler to form a colored dye throughout the coated surface of said sheet, said diazonium compound being such that said acidic sublimable material does not prevent it from combining with said coupler when exposed to alkaline vapor and wiping said coated surface to clear the colored dye from said image areas.

17. The process of claim 16 wherein said subject is substantially opaque.

18. The process of claim 16 wherein said sheet is light-transmitting.

19. The process of claim 16 wherein said graphic subject has a surface containing infrared absorbant image areas and background areas having relatively non-infrred absorbant properties and wherein said substantially uniform stratum of sublimable material is applied to said surface.

20. The process of claim 16 wherein said alkaline vapor is ammonia.

21. The process of claim 16 wherein said sublimable material is salicylic acid.

22. The product of the process of claim 5.

23. The product of the process of claim 11.

24. The product of the process of claim 17.

25. A process for making diazo copies from a graphic subject containing infrared absorbent image areas and background areas having relatively non-infrared absorbent properties, comprising the steps of applying a substantially uniform stratum of sublimable material onto said graphic subject, placing said stratum-containing subject in contact with the coated surface of a sheet having a coating thereon comprising a diazonium compound, said diazonium compound and said sublimable material being capable of coupling to form a colored dye, exposing said sheet and said graphic subject to infrared radiation for a time sufficient to heat and cause sublimation of quantities of said sublimable material from said image areas onto said sheet in the areas in juxtaposition with said images without substantial melting of said sublimable material, separating said sheet from said subject, exposing said sheet to alkaline vapor for sufficient time to permit said diazonium compound and said sublimable material to combine to form a colored dye.

26. A process for making copies from a graphic subject containing infrared absorbent image areas and background areas having relatively non-infrared absorbent properties comprising the steps of applying a substantially uniform stratum of a sublimable material onto said graphic subject, placing a coated sheet in contact with said stratum-containing surface, said coating comprising a metallic salt capable of combining with said sublimable material to form a colored composition, exposing said sheet and said stratum-containing surface to infrared radiation for a time sufficient to heat and cause sublimation of quantities of said sublimable material from said image areas onto said sheet in the areas in juxtaposition with said images without substantiala melting of said sublimable material, separating said sheet from said subject and exposing said sheet to alkaline vapor for a sufficient time to permit the formation of colored images.

27. The process of claim 26 wherein said metallic salts are selected from the group consisting of ferric sulfate, feric lactate and ceric sulfate and said sublimable material is salicylic acid.

28. A process for making copies from a graphic subject containing infrared absorbent image areas and background areas having relatively non-infrared absorbent properties comprising the steps of applying a substantially uniform stratum of a sublimable material onto said graphic subject, placing a coated sheet in contact with said stratum-containing surface, said coating comprising a dye which in crystalline form is relatively devoid of color as compared iwth the color intensity of said dye in solution, exposing said sheet and said stratum-containing surface to infrared radiation for a time sufficient to heat and cause sublimation of quantities of said sublimable material from said image areas onto said sheet in the areas in juxtaposition iwth said images without substantial melting of said material, separating said sheet from said subject and exposing said sheet to alkaline vapor for sufficient time to cause said dye to substantially increase in color intensity in the image areas.

References Cited

UNITED STATES PATENTS

| | | | |
|---|---|---|---|
| 3,170,395 | 2/1965 | Gundlach et al. | 250—65.1 |
| 3,228,769 | 1/1966 | Workman | 250—65.1 |
| 3,262,386 | 7/1966 | Gordon | 250—65.1 |
| 3,280,735 | 10/1966 | Clark et al. | 250—65.1 |

RALPH G. NILSON, *Primary Examiner.*

A. L. BIRCH, *Assistant Examiner.*

U.S. Cl. X.R.

96—49; 101—470; 117—36.8